Dec. 30, 1958 H. E. DUELL 2,866,291
ELECTRICALLY OPERATED FISHING REEL
Filed Aug. 7, 1956
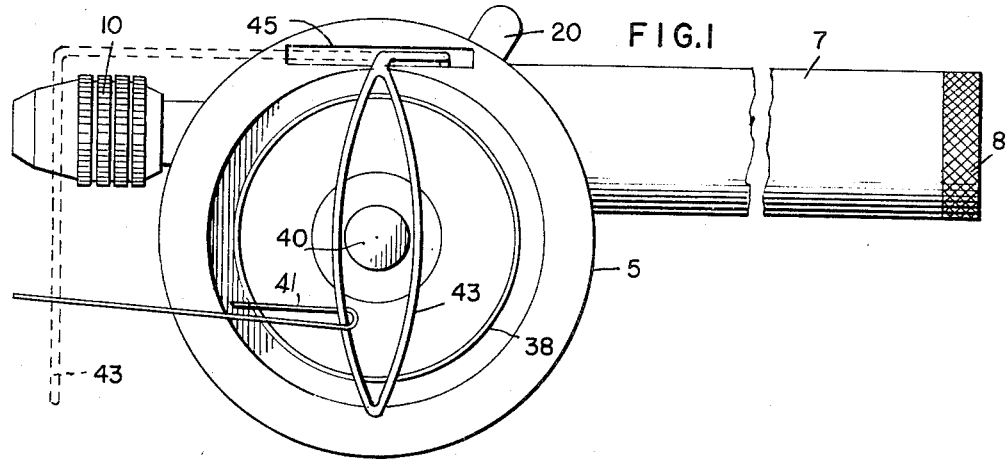
FIG.1
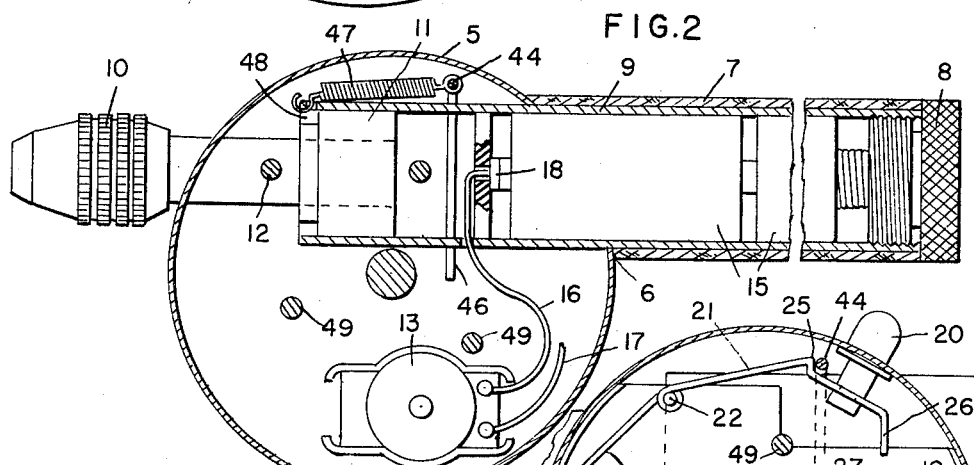
FIG.2
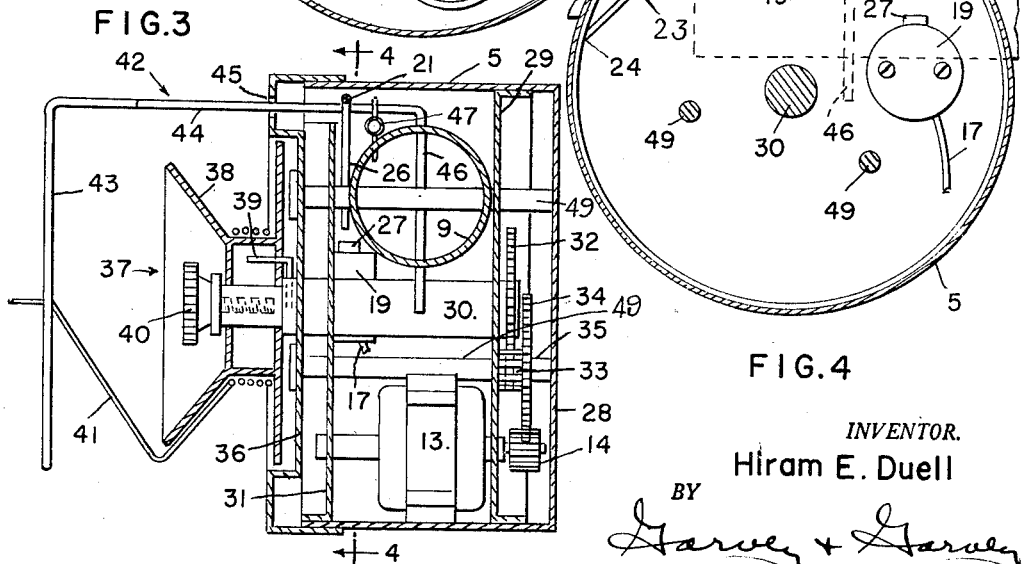
FIG.3
FIG.4
INVENTOR.
Hiram E. Duell
BY
Garvey + Garvey
ATTYS

United States Patent Office 2,866,291
Patented Dec. 30, 1958

2,866,291

ELECTRICALLY OPERATED FISHING REEL

Hiram E. Duell, Sidman, Pa.

Application August 7, 1956, Serial No. 602,571

2 Claims. (Cl. 43—21)

The present invention is an electrically operated fishing reel and has for its object to provide a self-contained electrically operated motor assembly for automatically rotating the reel without the use of clutches, brakes, multiple reels and like appurtenances.

Electrically operated fishing reels are known in the art as shown in prior art Patents Nos. 902,447 to Piper, October 27, 1908; 1,062,488 to McCluer et al., May 20, 1913; and 2,470,507 to Luton et al., May 17, 1949, but experiments have shown these devices to be impractical for modern fishing. I have found that to be practical, a minimum number of parts must be used and interrelated in a manner to insure instantaneous operation permitting the line to be cast in a normal manner, without fouling, and the reel instantly operated, at the option of the fisherman, to positively effect line take up.

It is within the contemplation of this invention to include in the motor assembly, a train of gears in operative engagement with the reel to serve the dual purpose of positively operating the reel and tensioning the latter sufficiently to prevent "creeping" or paying of the line until a fish has been hooked.

A further important object of this invention is to positively prevent line take up until the line guide frame has been moved into the line take up position and to provide common means to first initiate movement of this frame momentarily before rotation of the line reel is effected to pull in the line.

Other objects of the invention will be manifest from the following description of the present preferred form of the invention, taken in connection with the accompanying drawings, wherein:

Fig. 1 is a side elevational view of an electrically operated fishing reel constructed in accordance with the present invention, dotted lines being used to show position of the line guide frame after casting;

Fig. 2 is a fragmentary longitudinal sectional view of the invention, showing the fishing rod holding chuck in side elevation;

Fig. 3 is a vertical sectional view through the reel entity illustrating to advantage the manner of operatively connecting the motor to the reel spool, the line guide being shown in side elevation while in retracted position; and Fig. 4 is a vertical sectional view taken on the line 4—4 of Fig. 3, looking in the direction of the arrows, and showing the assembly, including a push button, for retracting the line guide before the line reel is activated.

The reel of this invention includes a housing 5 which may be circular and is in communication, through an opening 6, with a hollow handle 7 which latter may be cylindrical. The aft end of the handle is closed by a detachable cap 8. The handle includes a cork casing in which an aluminum cylinder 9 is concentrically mounted. As shown in Fig. 2, the inner end of the cork casing abuts the housing 5, while the inner terminal of the cylinder 9 terminates inside of said housing. A fishing rod chuck or socket 10 is mounted in a bearing 11 carried by the outer end of the cylinder. The free end of the chuck is positioned outside of the housing 5, an intermediate part of the chuck being secured to the housing by a stub shaft 12.

The housing 5 carries a motor assembly, generally designated 13. The assembly comprises a motor equipped with a drive shaft and pinion 14. The motor 13 is in circuit with a prime mover, generally designated 15 which may consist of dry cells mounted in the handle 7, through wires 16 and 17, the former extending to a battery contact 18 and the latter to a switch 19, the circuit being completed through casing 9 when the switch is closed by the operation of a push button 20 which protrudes through the housing 5 as shown advantageously in Fig. 4. The button 20 is part of an assembly which includes a yieldable wire 21 mounted on a pin 22 in the housing 5. One end 23 of the wire is in contact with the inner wall of the housing, as shown at 24. An intermediate part of the wire 21 is offset to provide a shoulder 25 and the extreme opposite terminal 26 bent downwardly to lie in superposed relation to a contact 27 mounted on the switch 19. The shaft of the push button 20 is engaged through a loop in the wire, as shown in Fig. 4, so that pressure on the push button 20 will flex the terminal 26 into engagement with the contact 27 in order to close the circuit through the wires 16 and 17, batteries 15 and cylinder 9. Consequently at the option of the user, the circuit is closed and the pinion 14 rotated by pressing on the button 20.

One end 28 of the housing is closed and the opposite end open. Positioned in the housing 5 adjacent the closed end 28, is a shelf 29 secured to the housing in any suitable manner. The shelf supports a train of gears in a manner hereinafter described and receives one end of an axle 30, the opposite end of the axle protruding through a plate 31 of similar construction to the shelf 29 and parallel therewith. A gear wheel 32 is carried by the axle and is in mesh with a small cog wheel 33 which latter is carried by the shaft of a gear wheel 34 comparable in size to the gear wheel 32. As shown in Fig. 3, the cog wheel 33 and gear wheel 34 are supported by a shaft 35 engaged with the closed end 28 of the housing. The pinion 14 and gear wheel 34 are, as also shown in Fig. 3, uniplanar and in mesh so that rotation of the pinion will impart rotation to the gear 34, simultaneously rotating the cog wheel 33 and gear wheel 32 to effect rotation of the axle 30.

The axle, in addition to extending through the plate 31, also passes through a cover plate 36, the terminal of the axle being reduced and carries a reel assembly 37. The assembly includes a reel spool 38 which is secured to the axle 30 by a key 39, the outer end of the key extending into the reel through a slot in the inner wall of the spool. The reel spool 38 is secured to the shaft by a thumb screw 40 in the manner illustrated in Fig. 3. The hub of the spool is adapted for the reception of a fishing line 41 trained on the hub in a manner well known in the art.

Mounted on the spool is a fishing line guide frame unit 42 comprising an elliptical-shaped eye 43, one end of which issues into a bar 44 which extends through a slot 45 in the cover plate 36, the inner terminal of the bar 44 being bent at right angles to provide a leg 46 which is adapted to extend through the cylinder 9 as shown in Figs. 2 and 3. An intermediate part of the bar 44 is engaged by one end of a coil spring 47, the opposite end of the latter being engaged with a shoulder 48 on the end of the cylinder 9, within the housing 5, the spring being offset from the longitudinal axis of the casing, as shown in Fig. 3. The spring 47 normally exerts a pull on the bar 44 to normally hold the line eye of the line guide frame unit in the position illustrated by the dotted lines in Fig. 1. However, the spring 21 acts as a trigger to hold the line guide frame unit in a "cast" position as shown by the full lines in Fig. 1. Operation of the line guide unit is accomplished by pressing the button 20 until the bar portion 44 thereof snaps over the shoulder 25 into the position shown in Figs. 1 and 4. Continued pressure on the button 20 urges the part 26 of the wire 21 into engagement with the contact 27 so as to close the circuit and thereby operate the motor 13 which, in turn, effects rotation of the reel spool through the train of gears and axle 30. This delayed action of closing the circuit momentarily after the movement of the line unit is accomplished by providing a space or gap between part 26 and contact 27 longer than the length of the shoulder 25.

The cover plate 36 is engaged with the housing by a plurality of rods 49, one of which extends through the inner end of the cylinder 9 as advantageously illustrated in Fig. 3.

In use of this device, with the pole engaged in the socket 10, the line 41 passes through the eye 43, which is in "cast" position and spins off the spool without any rotation of the latter. When the line is to be drawn in, after a bite, the line unit is moved forward by spring 47 and the reel spool then rotated by pressure on the button 20. This is accomplished by the hand of the operator which is supporting the reel handle, leaving the other hand free to consummate hauling in of the fish.

The reel spool 38 may be of any desired size and the fish line changed to adapt the device for use in hauling in fish of different sizes and of different propensities. The reel spool may be quickly removed and interchanged in an obvious manner.

All operations connected with the casting and reeling in of the fish can be effected by one hand of the fisherman. In other words, casting is effected in the usual manner and possibility of fouling the line is reduced to a minimum, particularly with use of the gear train connection with the motor and the axle. Furthermore, this arrangement of tying in the reel spool with the motor through a train of gears, provides sufficient braking action to retain the line in a "cast" position without casual paying out or creeping of the line until the hook is grasped by a fish. At the psychological moment after the fish engages the hook, pressure is exerted on the push button to automatically retract the line guide unit and pull in the line and reel it on spool.

While I have hereinshown and described a preferred embodiment of my invention, it is nevertheless to be understood that various changes may be made therein, without departing from the spirit and scope of the claims hereto appended.

What I claim is:

1. An electrically operated fishing reel including a reel housing and communicating hollow handle, a motor assembly in the housing comprising a motor, a train of gears operatively connected thereto and a source of electrical energy in the handle in circuit with the motor and with a manual circuit closer on the housing, a fishing line reel spool mounted on the housing and in operative engagement with said gears to effect rotation of the drum when the circuit closer is operated, for winding the line on the drum, a fishing line guide unit normally positioned in a line casting position on the reel, and means on the reel housing to automatically move the unit into a line reeling position when the manual circuit closer is operated.

2. An electrically operated fishing reel including a reel housing and a communicating hollow handle, a motor assembly in the housing comprising a motor and a source of energy in the handle in circuit with the motor and with a manual circuit closer on the housing, yieldable electrical conductor means mounted in the housing one end of which is grounded to the housing and the other end positioned adjacent a switch in electrical connection with said motor, a fishing line reel spool mounted on the housing and in operative connection with said motor, the manual circuit closer being engageable with the yieldable conductor means to urge the latter into contact with said switch to close the circuit and effect rotation of the spool for winding the line thereon and a fishing line guide unit normally locked in a line casting position on the reel housing by said yieldable electrical conductor means, movement of the manual circuit closer releasing the line guide unit, to permit its movement to a line reeling position before the circuit to the reel spool and motor is closed.

References Cited in the file of this patent

UNITED STATES PATENTS

| 902,447 | Piper | Oct. 27, 1908 |
| 1,062,488 | McCluer | May 20, 1913 |
| 1,625,988 | Dice | Apr. 26, 1927 |
| 2,262,637 | Fanshier | Nov. 11, 1941 |
| 2,723,808 | Elliott | Nov. 15, 1955 |
| 2,776,515 | Lynch | Jan. 8, 1957 |

FOREIGN PATENTS

| 859,236 | France | June 3, 1940 |